(12) United States Patent
Pelletier

(10) Patent No.: US 11,505,957 B2
(45) Date of Patent: Nov. 22, 2022

(54) ADJUSTABLE SUPPORT PROP

(71) Applicant: Kevin P. Pelletier, St Louis, MO (US)

(72) Inventor: Kevin P. Pelletier, St Louis, MO (US)

( * ) Notice: Subject to any disclaimer, the term of this patent is extended or adjusted under 35 U.S.C. 154(b) by 0 days.

(21) Appl. No.: 15/222,469

(22) Filed: Jul. 28, 2016

(65) Prior Publication Data
US 2018/0058083 A1 Mar. 1, 2018

(51) Int. Cl.
| | | |
|---|---|---|
| *E04G 25/04* | (2006.01) |
| *E04G 1/22* | (2006.01) |
| *B25H 1/00* | (2006.01) |
| *F16M 11/00* | (2006.01) |
| *F16M 13/02* | (2006.01) |
| *E04G 25/00* | (2006.01) |
| *F16M 11/36* | (2006.01) |
| *F16M 11/28* | (2006.01) |

(52) U.S. Cl.
CPC ......... *E04G 25/04* (2013.01); *B25H 1/0035* (2013.01); *E04G 1/22* (2013.01); *E04G 2025/003* (2013.01); *F16M 11/28* (2013.01); *F16M 11/36* (2013.01); *F16M 13/022* (2013.01)

(58) Field of Classification Search
CPC ......... A47B 51/00; A47B 96/00; E04F 21/00; E04G 25/06; F16M 11/00; F16M 11/28; F16M 11/36; F16M 13/022
USPC .......... 248/188.2, 351, 354.3, 354.4; 269/37, 269/904; 312/245
See application file for complete search history.

(56) References Cited

U.S. PATENT DOCUMENTS

| | | | | |
|---|---|---|---|---|
| 4,955,592 A * | 9/1990 | Brennan, Sr. | ....... | E04F 21/1805 269/68 |
| 4,981,288 A * | 1/1991 | Goss | ...................... | H01Q 1/125 269/79 |
| D338,310 S * | 8/1993 | Clarke | ........................... | D34/31 |
| 6,074,143 A * | 6/2000 | Langston | .................. | B60P 1/00 410/143 |
| 6,505,803 B1 * | 1/2003 | Hernandez | ............. | A47B 51/00 248/354.3 |
| 6,863,270 B2 * | 3/2005 | Bartley, Jr. | ............ | A47B 51/00 269/37 |
| 6,874,739 B1 * | 4/2005 | Gregory | .................... | B66F 3/08 248/188.4 |
| 8,146,873 B2 * | 4/2012 | Johnson | ............... | A47B 96/061 248/201 |
| 2006/0243524 A1 * | 11/2006 | Jarrell | ..................... | E04G 5/062 182/82 |
| 2009/0008849 A1 * | 1/2009 | Cunningham | ......... | A47B 96/07 269/79 |
| 2010/0270445 A1 * | 10/2010 | Johnson | ............... | A47B 96/061 248/201 |

\* cited by examiner

*Primary Examiner* — Tan Le

(57) ABSTRACT

An adjustable support prop that can be customized to the support requirements of a wide variety of objects to be held in place. The prop includes first, second and third support members which are coupled together in a manner that allows the weight of an object to be supported in order to provide stability to the prop. The length of one of the support members is adjustable so that the height of the prop can be customized to the support requirements of the object to be supported.

6 Claims, 16 Drawing Sheets

Prior Art

Prior Art

Prior Art

Prior Art

Prior Art

Prior Art

ADJUSTABLE SUPPORT PROP

BACKGROUND OF THE INVENTION

The present invention generally relates to the field of prop and support tools for maintaining an object in a desired position, and more particularly, is directed to an adjustable support prop that can be customized to the support requirements of a wide variety of objects to be held in place.

Construction tradesmen often are required to install heavy and bulky objects overhead that typically require two or more people to safely complete the installation. Once the object is lifted into place, it must be safely held until the installation is completed.

Such installations often are performed by a fewer number of people than safety considerations suggest due to cost or lack of other available helpers. Moreover, many tradesmen work alone as most of their work can be done by themselves. When help is required, the lone tradesman often resorts to mechanical assistance in the form of props and supports that can be fabricated from materials at the job site, such as scrap pieces of lumber and the like.

The installation of cabinets raises a particular concern with respect to the proper equipment needed for their installation. Cabinets tend to be heavy and bulky. If they fall unexpectedly, cabinets can be damaged, as well as cause damage to the finished floor on which they hit, and injury to the installer(s).

The problems posed by the installation of cabinets are particularly aggravated by the fact that most installations are performed by a single person due to labor cost concerns.

The prior art is aware of various prop and support tools that are designed to help the cabinet installer when working alone.

FIGS. 1 and 2 illustrate two lay-person approaches to props and supports used for the installation of cabinets. FIGS. 3-6 are commercial embodiments of various cabinet props and supports.

The support prop shown in FIG. 3 is sold commercially under the name The Stand-In. While this prop offers advantages over the other supports and props that are illustrated in FIGS. 1, 2 and 4-6, there remains a need in the art for an adjustable prop that is effective for its intended purpose and is economical to manufacture.

DESCRIPTION OF THE DRAWINGS

The novel features of the present invention are set out with particularity in the appended claims, but the invention will be understood more fully and clearly from the following detailed description of the invention as set forth in the accompanying drawings in which:

DESCRIPTION OF THE PREFERRED EMBODIMENT

A preferred embodiment of the present invention will now be described with reference to the accompanying drawings.

Figure 1:
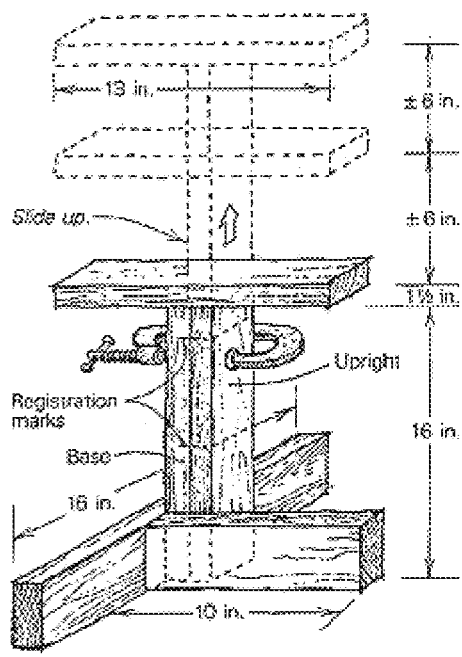
FIGS. 1-6 are prior art embodiments of various props and supports that are known in the art.
Figure 2:
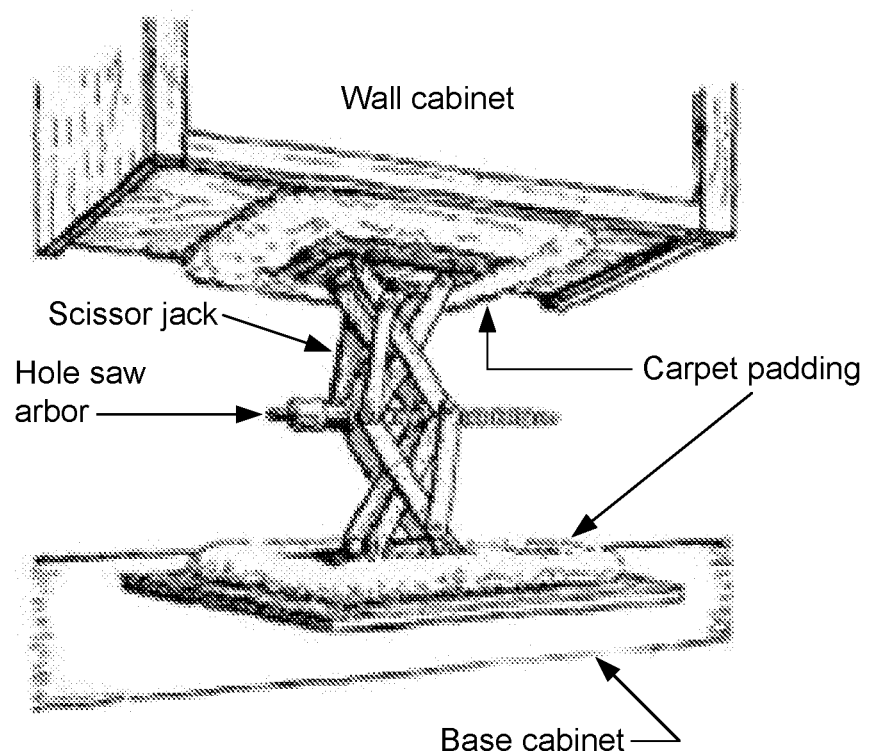
Figure 3:
Figure 4:
Figure 5:
Figure 6:
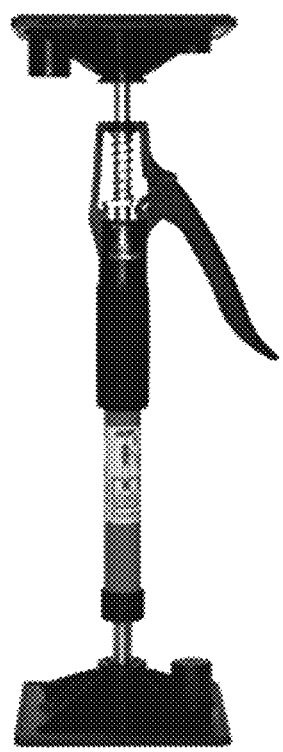
Figure 7:
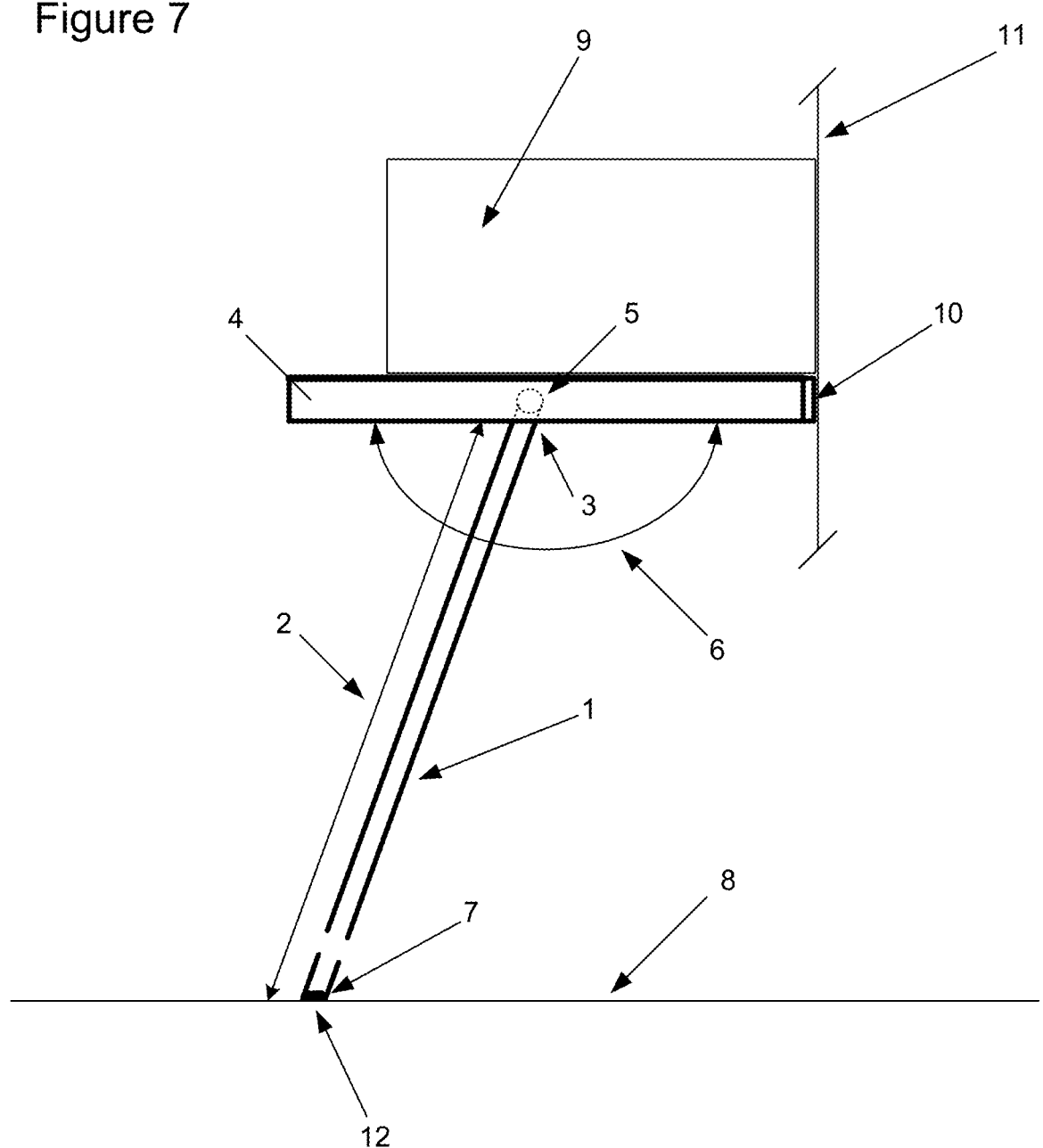
FIG. 7 is an illustrative side view of one embodiment of an adjustable prop in accordance with the present invention.

FIG. 1 is a first illustrative side view of one embodiment of an adjustable prop in accordance with the present invention. As shown in FIG. 7, the prop comprises an extension pole 1 having a length indicated by arrow 2. A first end 3 of pole 1 is attached to support bar 4 at pivot point 5 which allows pole 1 to rotate relative to support bar 4 as indicated by arrow 6. The other end 7 of pole 1 rest on floor 8, or other supporting surface, such as a counter top.

Pole 1 may be formed of a series of telescoping concentric tubes as is known in the art so that its length can be adjusted depending on the height above floor 8 at which object 9 needs to be supported. End 7 of pole 1 includes an antiskid stabilizer 12 made of, for example, rubber, which prevents the end of pole 1 from moving under the weight of object 9.

Figure 8:
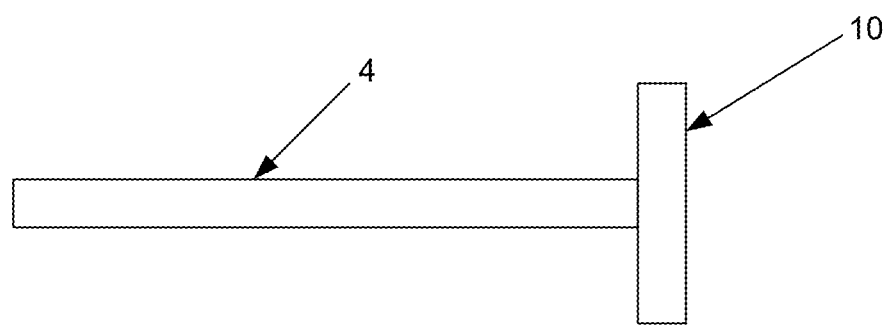
FIG. 8 is an illustrative top view of the adjustable prop shown in FIG. 7.

FIG. 8 is an illustrative top view of support bar 4 showing end support piece 10 attached to one end of support bar 4. As shown in FIG. 7, end support piece 10 is in touching contact with wall 11 to which object 9, for example, a kitchen cabinet, will be attached.

In accordance with the present invention, the weight of object 9 is used as an aid to further stabilize the prop device so that object 9 is held in a secure position until it is permanently attached to wall 11.

Figure 9:
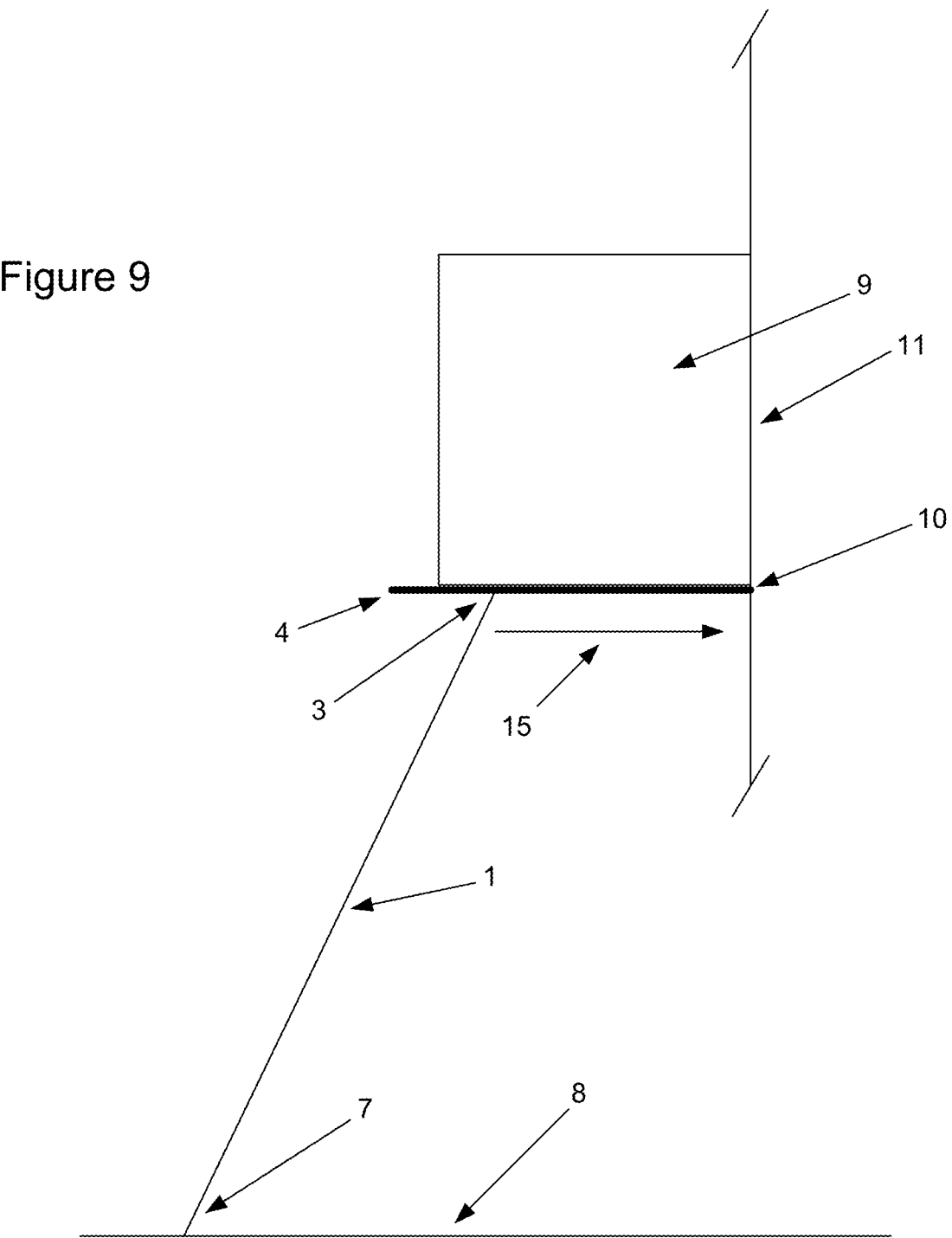
FIG. 9 illustrates the forces that are applied by an object being supported in order to make the support prop of the present invention rigid and stable.

With reference to FIG. 9, the weight of object 9 bearing down on support bar 4 causes a corresponding pressure to be exerted on support bar 4. A portion of that pressure is redirected to support piece 10 as indicated by arrow 15. The rotating connection of pole 1 to support bar 4 facilitates the redirection of the downward pressure indicated by arrow 5. The forward directed pressure pushes support piece 10 against wall 11.

Note that, as shown in FIG. 7, end 7 of pole 1 is held securely in position on floor 8. Because end 7 of pole 1 is fixed in position, the exerted pressure against support piece 10 causes the prop device of the present invention to form a ridge and stable support structure. Thus, in accordance with the present invention, the weight of the object being supported is used to help stabilize the prop device, thereby insuring a much more safe installation of object 9 onto wall 11.

Figure 10:
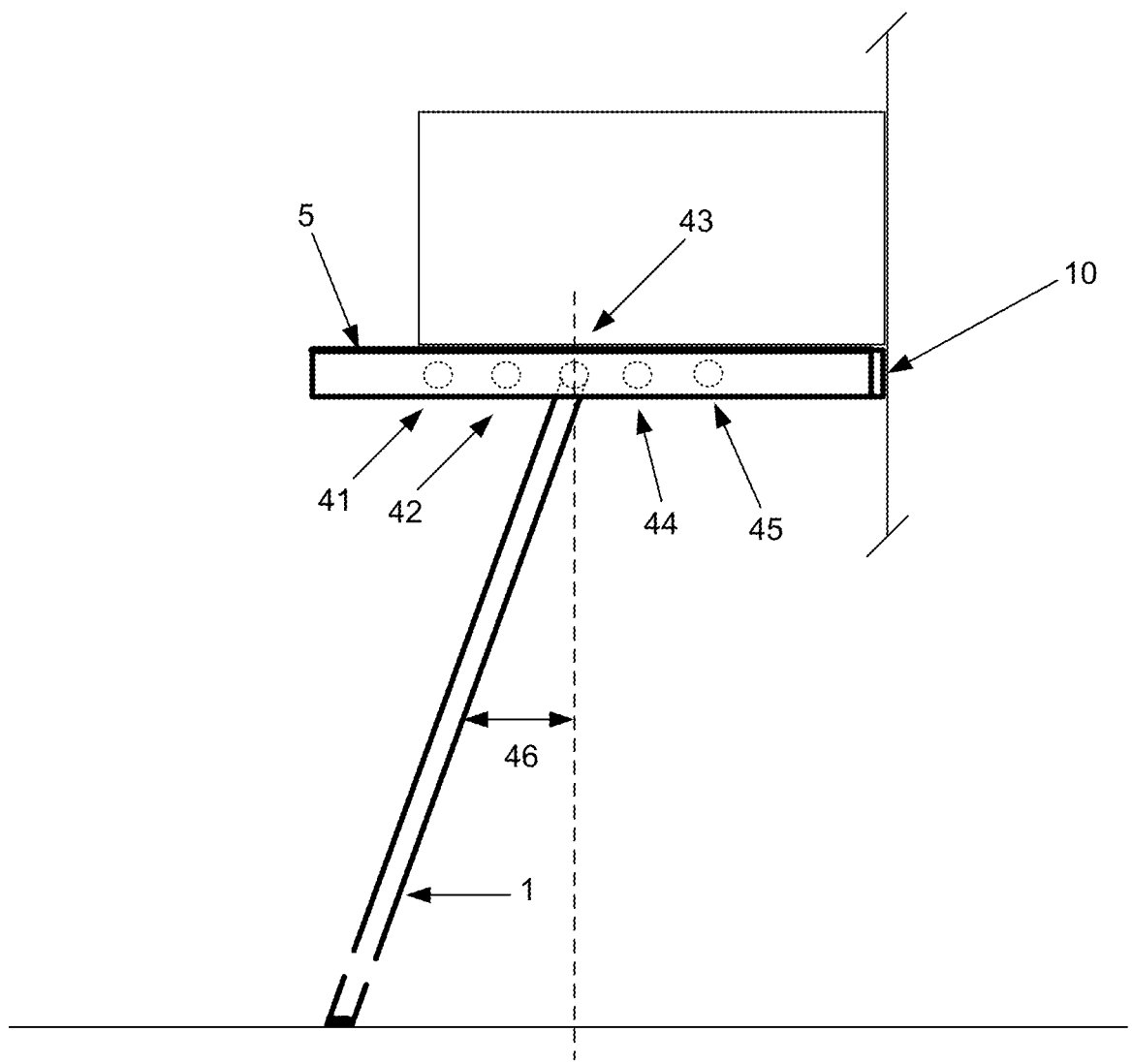
FIGS. 10 and 11 illustrate various angles of the extension pole of the adjustable prop of the present invention.

As shown in FIG. 10, the most effective rotating attachment point for pole 1 to support bar 4 can be achieved by providing a plurality of attachment point 41 to 45. The user need only select the appropriate attachment point which maximizes the pressure on support piece 10. Typically, the amount of pressure on support piece 10 occurs when pole 1 is at the maximum angle 46 that is possible for the particular installation.

Figure 11:
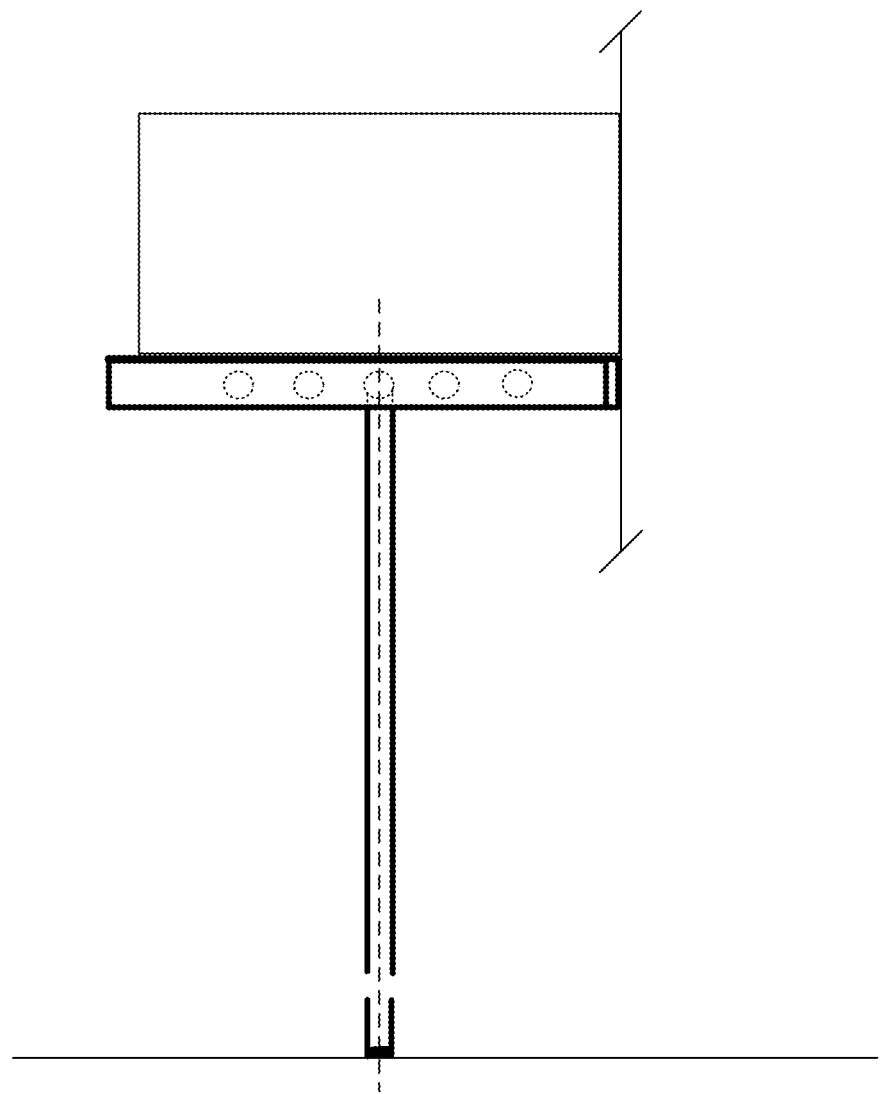

The prop device of the present invention has also proved to be effective in situations where space constraints limit pole 1 to being perpendicular to support bar 4. Such a configuration is shown in FIG. 11.

Figure 12:
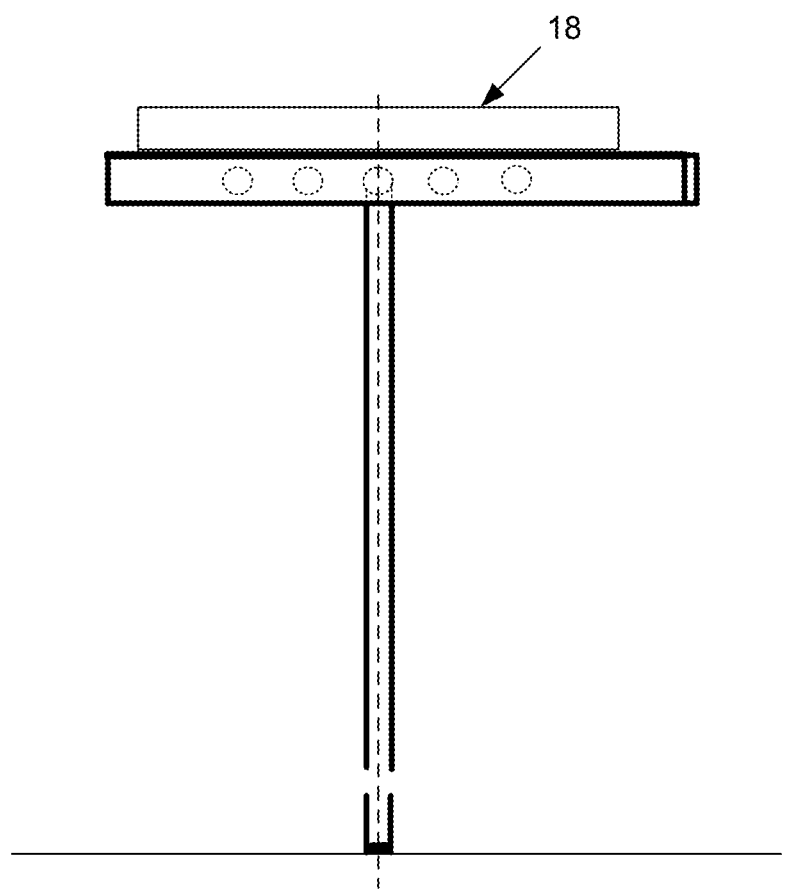
FIG. 12 is an illustrative side view of the adjustable prop temporarily supporting one end of an overhanging countertop while sanding and shaping to fit during installation.

Moreover, there are many situations where attaching pole 1 to support bar 4 is the most effective when pole 1 is perpendicular to support bar 4, i.e., when supporting an overhanging counter top 18 as shown in FIG. 12.

Figure 13:
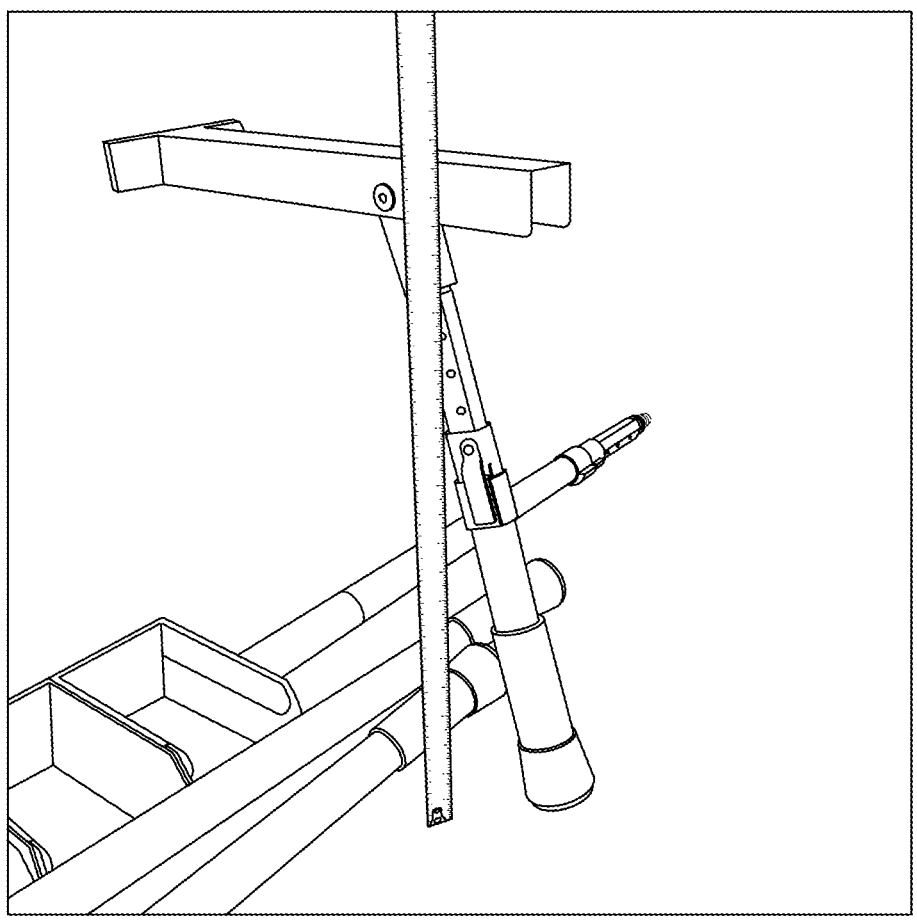
FIG. 13 illustrates a commercial embodiment of the adjustable prop in accordance with the present invention.

FIG. 13 is one example of a commercial embodiment of the present invention wherein pole 1 has been compressed.

Figure 14:
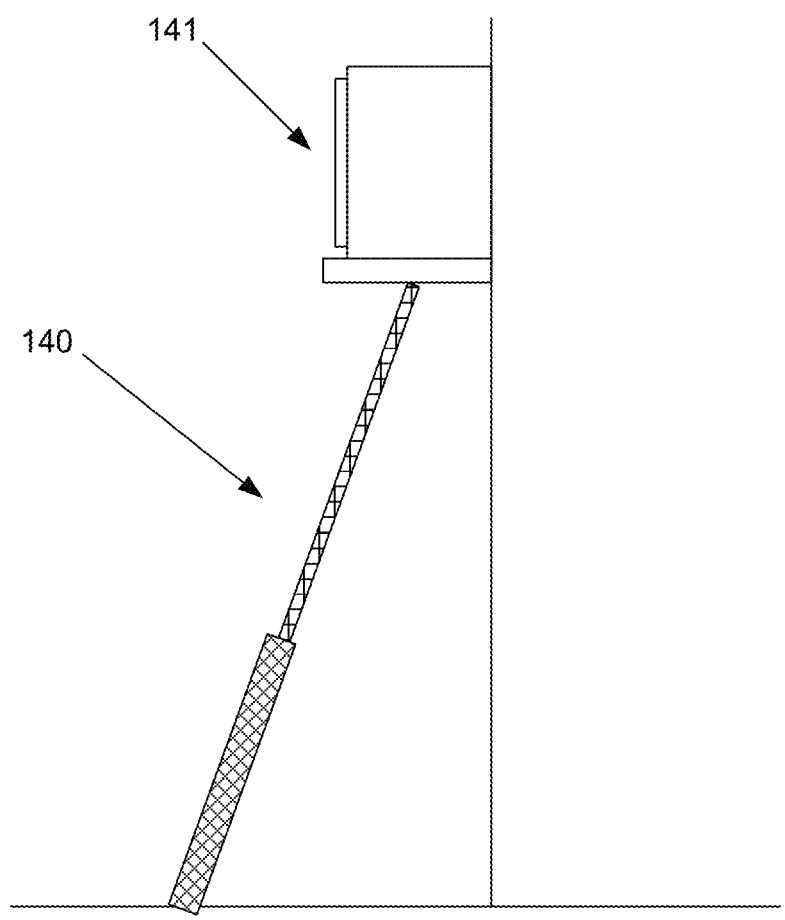
FIGS. 14-17 illustrate various uses and applications of the adjustable prop in accordance with the present invention.

FIG. 14 is a further illustration of the prop device 140 of the present invention shown supporting a cabinet 141 during its installation.

Figure 15:
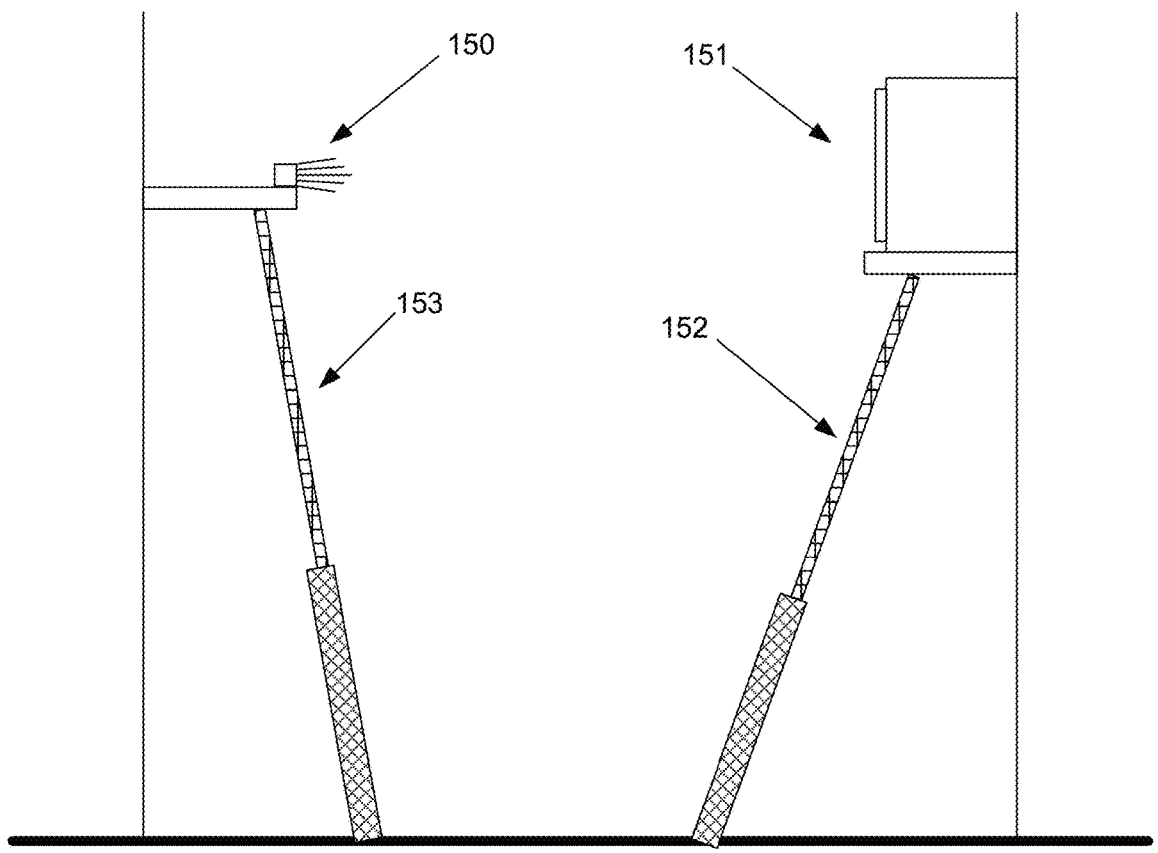

During the installation of cabinetry, installers will often us some type of leveling tool, such as laser pointer 150 shown in FIG. 15, in order to ensure that the cabinet 151 is level during its installation. The prop device of the present invention allows, not only cabinet 151 to be supported by prop device 152, but also laser pointer 150 to be supported at the appropriate height by a second prop device 153.

Figure 16:
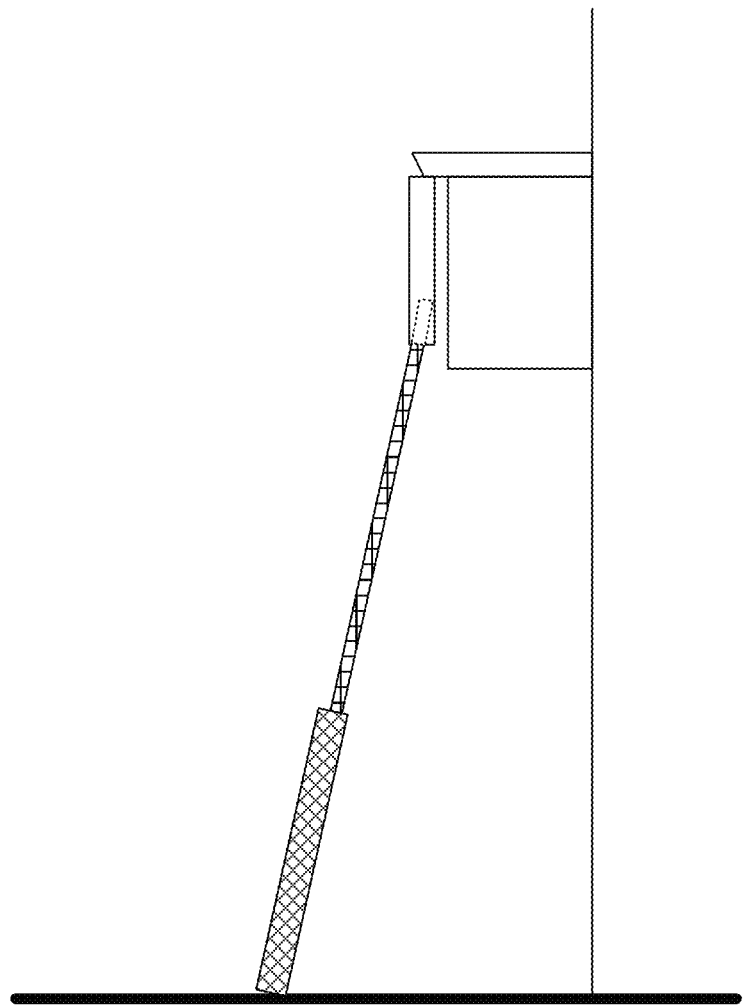

FIG. 16 illustrates the prop device of the present invention configured to support a cabinet crown 161 during its installation.

Figure 17:
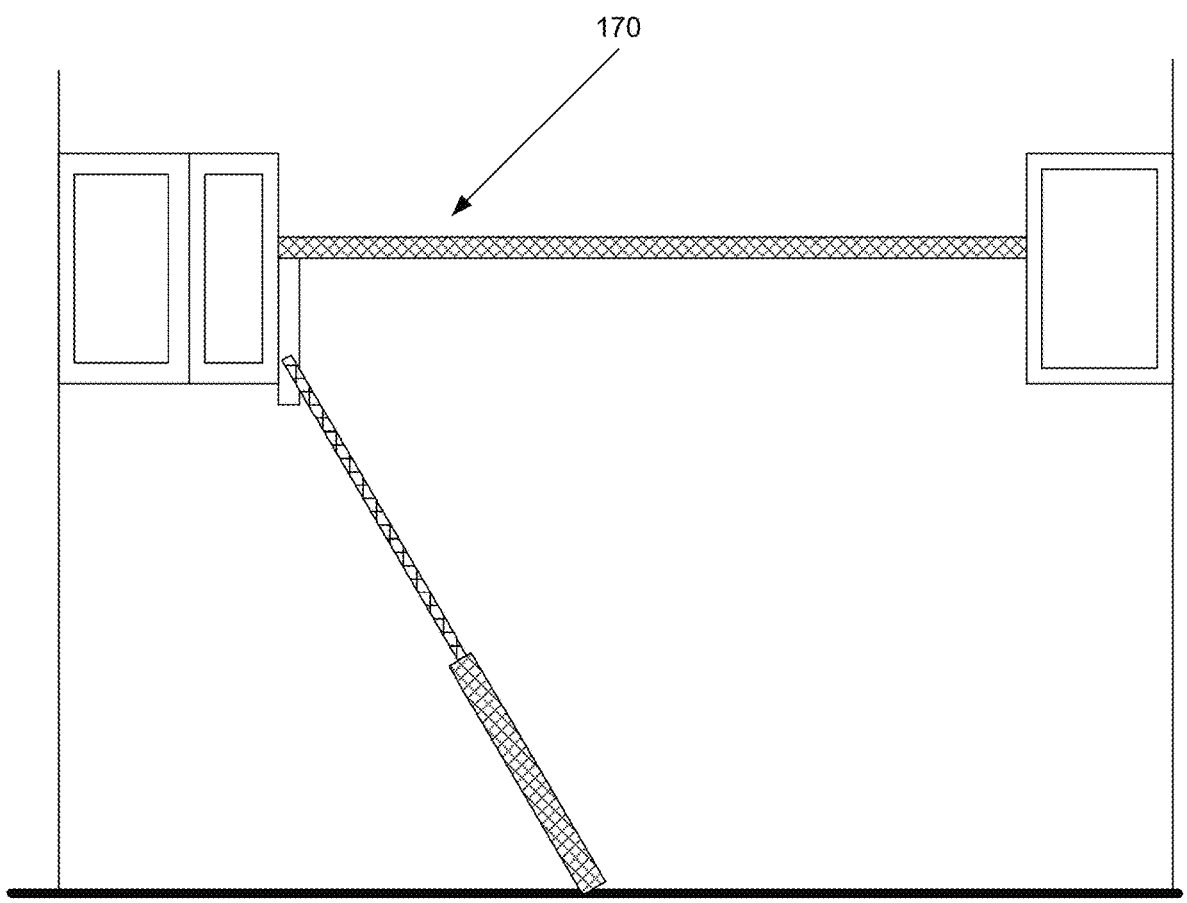

FIG. 17 illustrates the prop device of the present invention used to support a floating shelf 170 during its installation.

The present invention takes into consideration such important safety concerns as maximum weight bearing loads. With reference again, for example, to FIG. 9, pole 1 should be make out of a material having sufficient strength to support the maximum load put on the pole by support piece 10 due the weight of object, plus a margin of error.

While the foregoing specification teaches the principles of the present invention, with examples provided for the purpose of illustration, it will be appreciated by one skilled in the art from reading this disclosure that various changes in form and detail can be made without departing from the true scope of the invention.

I claim:

1. A cabinet jack for supporting a wall cabinet during installation, said cabinet jack comprising:
   an extendable support pole having a first coupling device on a first end and an anti-slip device on a second end;
   a cabinet support member having first and second ends, wherein said second end is adapted to be positioned adjacent to the wall to which the cabinet is being installed when said cabinet jack is being used;
   a second coupling device located between said first and second ends of said cabinet support member at a plurality of predetermined attachment points, said second coupling device cooperating with said first coupling device to rotatably attach said cabinet support member to said extendable support pole at a selected one of said plurality of predetermined attachment points, wherein said cabinet support member is adapted to carry the weight of the cabinet when the cabinet is being installed;
   an end support member coupled to said cabinet support member at said second end and being adapted to engage said wall when said cabinet jack is being used; and
   wherein the weight of the cabinet on said cabinet support member causes lateral pressure to be exerted on the wall to which the cabinet is being attached in order to stabilize said cabinet jack.

2. The cabinet jack of claim 1, wherein said extendable support pole is of tubular construction.

3. The cabinet jack of claim 1, wherein said extendable support pole is comprised of a plurality of telescoping concentric tube, wherein the length of said extendable support pole can be adjusted.

4. The cabinet jack of claim 1, wherein said attachment points of said cabinet support member are located such that the weight of the cabinet to be supported causes said end support member to exert pressure against the wall to which the cabinet is to be installed.

5. The cabinet jack of claim 1, wherein said first and second coupling devices are sufficiently tightened to prevent said cabinet support member from freely rotating about said extendable support pole, said tightness allowing said cabinet support member to remain in a generally horizontal position when elevated to said position relative to the surface on which said support jack rests.

6. The cabinet jack of claim 1, wherein said anti-slip device is a rubber foot.

\* \* \* \* \*